Jan. 17, 1961 J. A. BROWN 2,968,068
METHOD AND APPARATUS FOR MAKING FELTS
AND BATTS FROM FIBROUS MATERIAL
Filed July 22, 1957 4 Sheets-Sheet 1
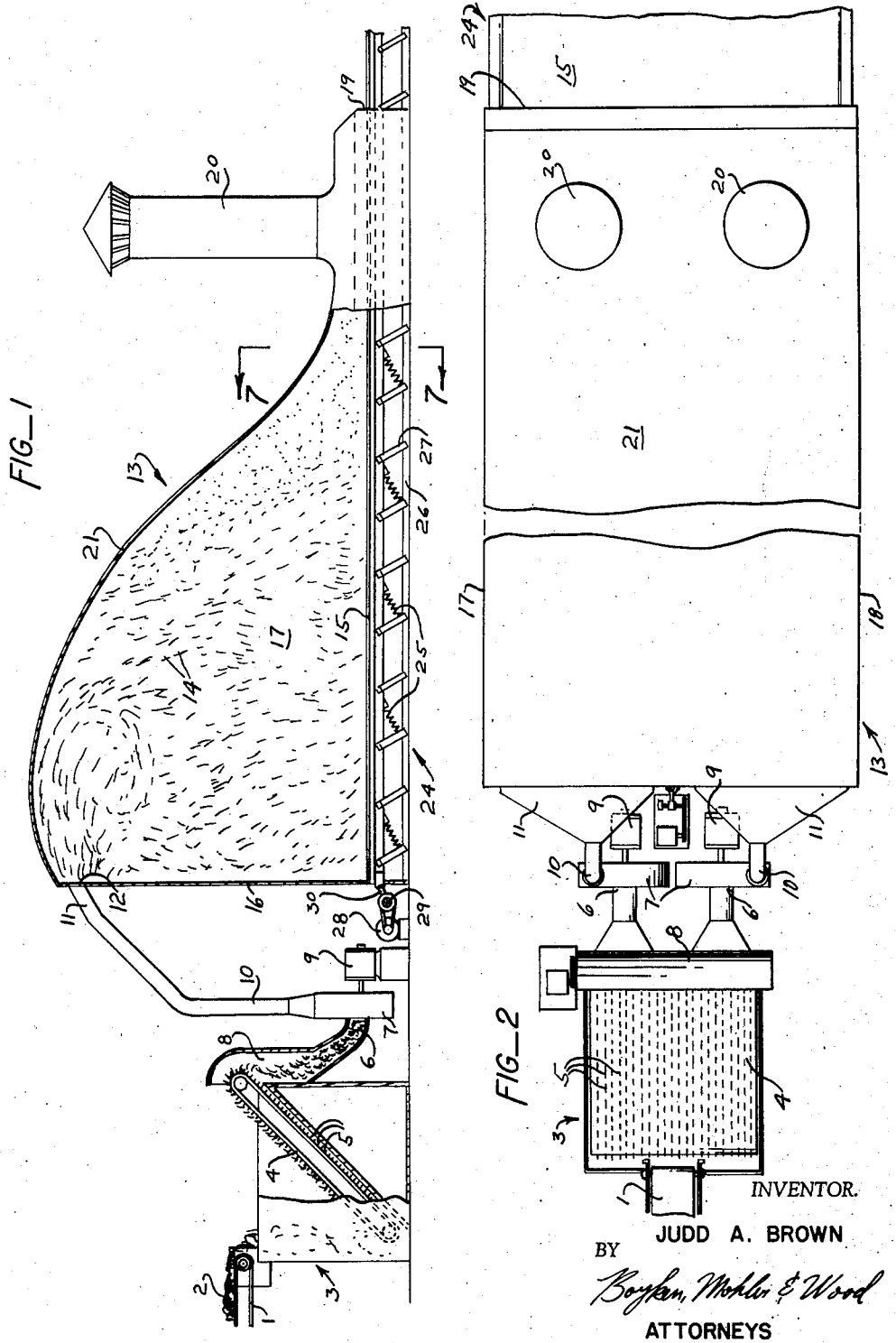
INVENTOR.
JUDD A. BROWN
BY
Boyken, Mohler & Wood
ATTORNEYS

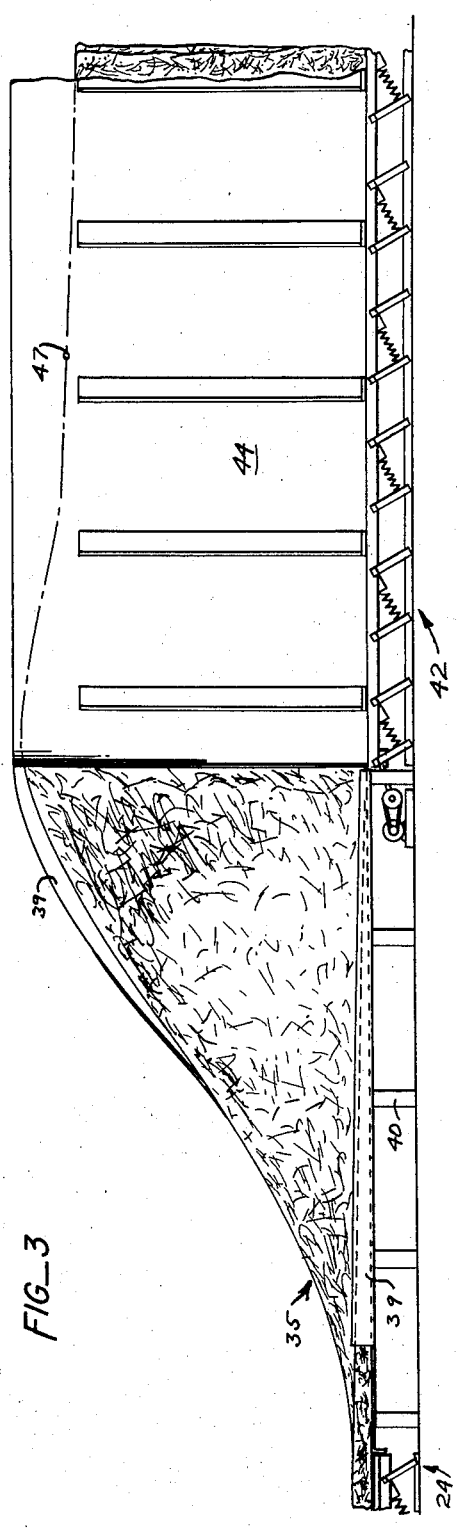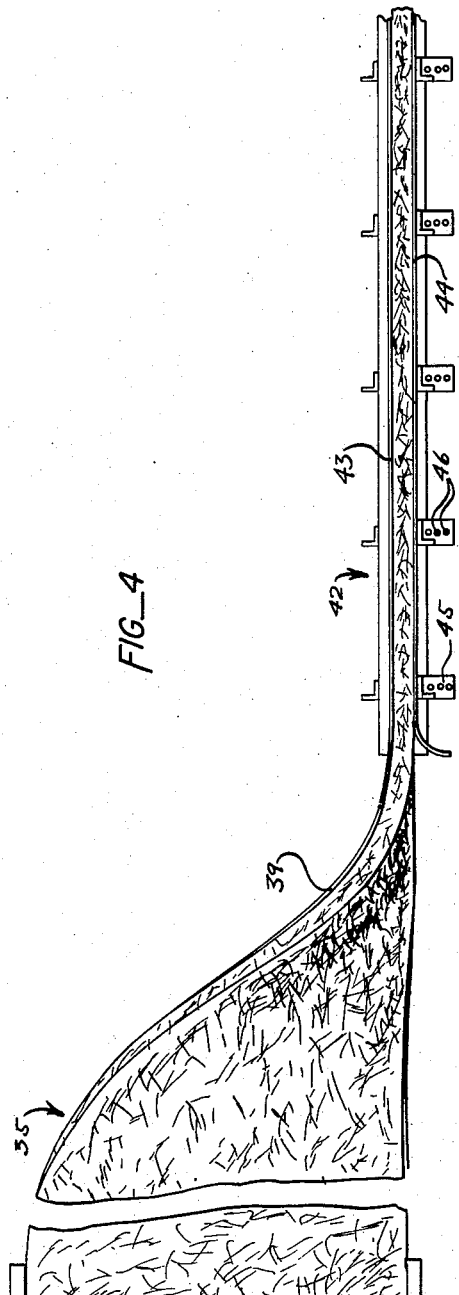

Jan. 17, 1961   J. A. BROWN   2,968,068
METHOD AND APPARATUS FOR MAKING FELTS
AND BATTS FROM FIBROUS MATERIAL
Filed July 22, 1957   4 Sheets-Sheet 3
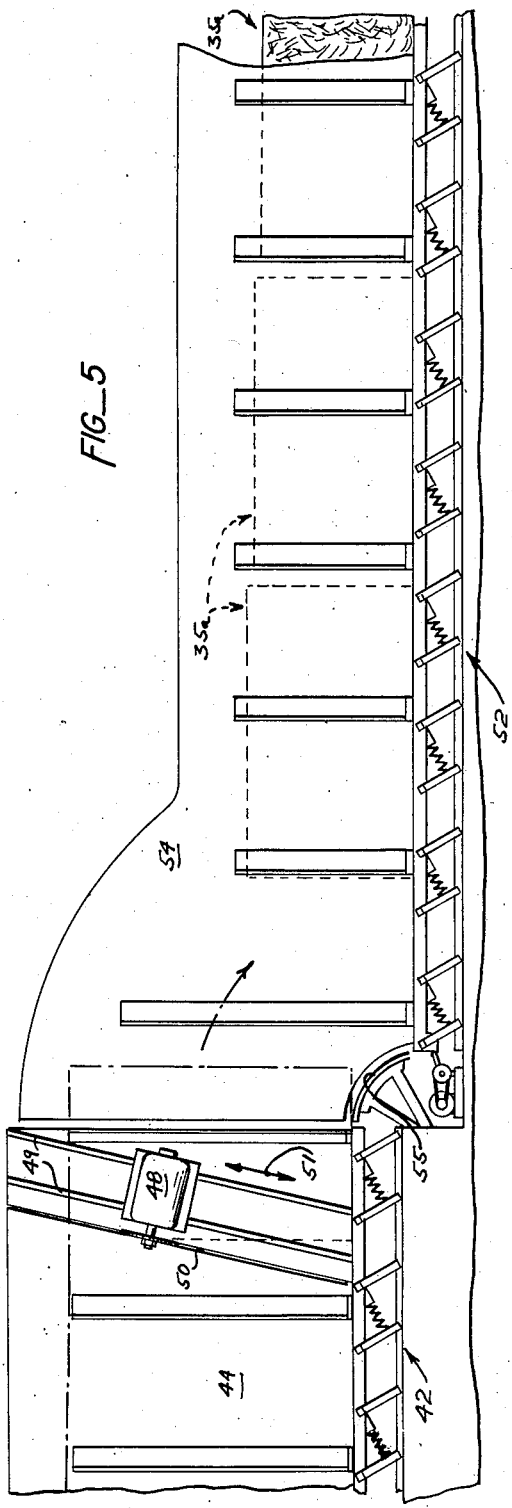
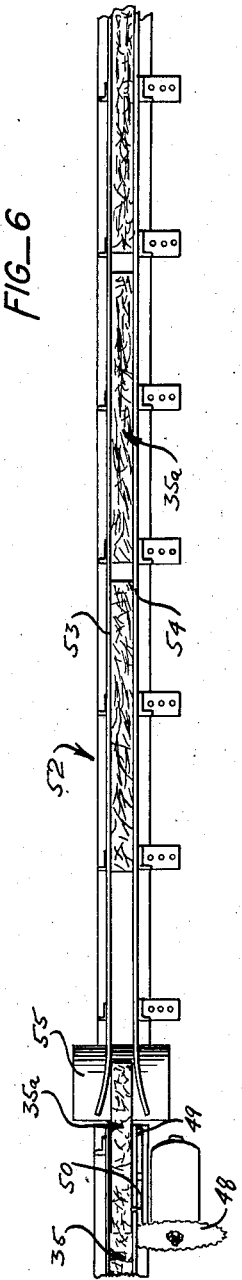
*INVENTOR.*
JUDD A. BROWN
BY
ATTORNEYS Jan. 17, 1961 J. A. BROWN 2,968,068
METHOD AND APPARATUS FOR MAKING FELTS
AND BATTS FROM FIBROUS MATERIAL
Filed July 22, 1957 4 Sheets-Sheet 4
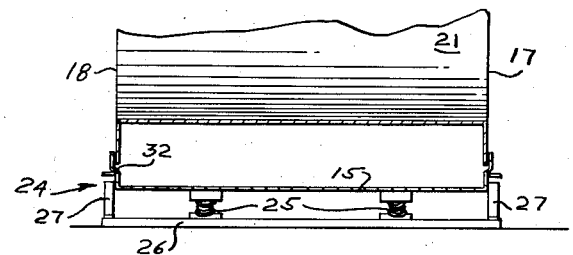
FIG_7
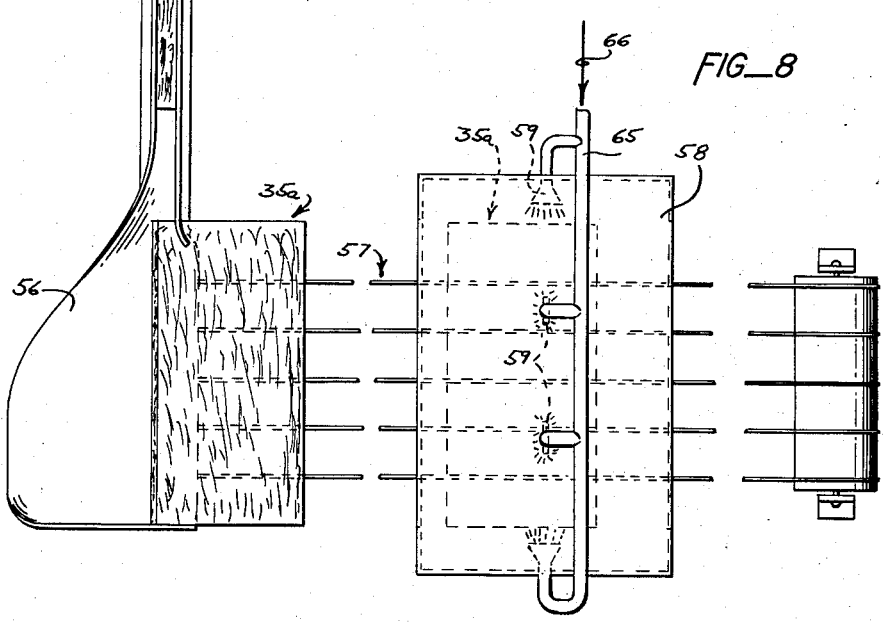
FIG_8
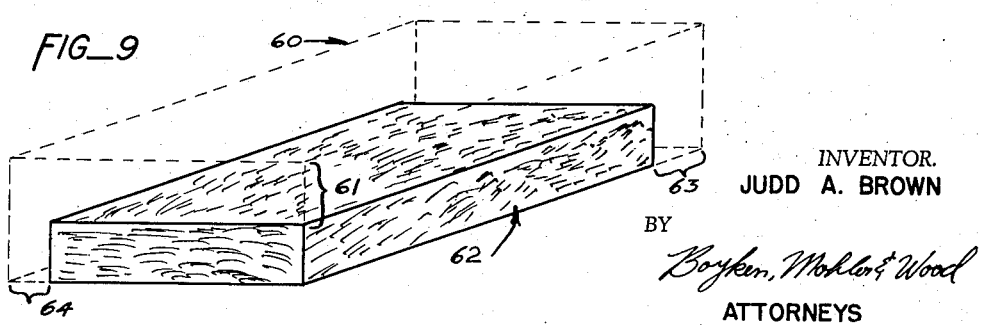
FIG_9
INVENTOR.
JUDD A. BROWN
BY
Boyken, Mohler & Wood
ATTORNEYS

United States Patent Office 2,968,068
Patented Jan. 17, 1961

2,968,068
METHOD AND APPARATUS FOR MAKING FELTS AND BATTS FROM FIBROUS MATERIAL

Judd A. Brown, 101 Hilldale Drive, San Anselmo, Calif.

Filed July 22, 1957, Ser. No. 673,325

11 Claims. (Cl. 19—155)

This invention relates to insulation felt and batts and more particularly to a new and novel method and device for the manufacture thereof.

In building construction it is the usual practice to install insulation material in the dead air space existing between the inner and outer walls of a building or over ceilings and under floors. Insulation comes in a wide variety of forms and may be of organic or inorganic composition. In many instances the insulating material comes in the form of generally rectangular panels in rolls, pads or batts. It is customary to sandwich the insulating material between outer surfaces such as kraft paper, metal foil, etc. The insulation batt is also available in long rolls of the sandwiched material that may be cut and shaped to the desired configuration at the job site.

The advantages of preformed and preshaped insulation batts are obvious over, say, bulk insulation material. The insulation batts heretofore available are not without their disadvantages however. One primary disadvantage in addition to higher freight cost is the higher cost of the preformed batts. This is due to the complexity of the manufacturing processes required and also the time required for such processing.

The sound deadening and heat insulating sheets and boards of the prior art are usually made by a wet process, hence the long drying operation. It is also common practice in the prior art products to introduce binders such as phenolic resins to hold the fibers together and prevent separation. These binders not only increase the cost of the batts and further complicate the manufacture thereof but also tend to cause the batt to set. This setting is caused by the hardening of the binders and makes the batt stiff and hard to manipulate and subject to fracture.

It is an object of this invention to provide a dry method of manufacturing insulation batts of the fiber type that provides a superior product at a more economical price than has heretofore been possible.

It is another important object of this invention to provide a processing device by means of which the above object may be accomplished.

Another object of this invention is the provision of means for forming an insulation batt that can be made from any variety of organic or inorganic fibers such as cotton, rock wool, glass, asbestos, or wood fibers.

Yet another object of this invention is the provision of means for manufacturing an insulation batt or felt which may be further compressed and which will also remain flexible because of the elimination of binders from the batt fibers.

Still another object of this present invention is the provision of a method of manufacture and a device for producing an insulation batt or felt of uniform density creating the optimum balance of entrapped air spaces to that of solids to provide maximum insulating effect.

In this connection it should be noted that a good insulating material is one which breaks up the air space to be insulated into as many air pockets as possible to minimize heat transfer by convection, and at the same time provides discontinuities in the insulating material so as to minimize heat transfer by conduction. By the present invention optimum insulating effect is achieved by following this principle.

Another important object of this invention is the provision of a machine for the automatic manufacture of insulation batts or felts whereby the felt is produced in a steady progressive manner.

Yet another important object of the invention is to provide means for effecting a random orientation of the insulation fibers so that said fibers intermesh with one another while remaining substantially in parallel planar orientation. The result is that the strength of the material is enhanced so that it is readily handled without crumbling and at the same time the void spaces are adequately broken up.

Other objects and advantages will be obvious from the detailed specification and accompanying drawings, wherein:

Fig. 1 is a semischematic side elevation, partly in section, of the initial stage of the continuous process felt manufacturing machine;

Fig. 2 is a semischematic top plan view of Fig. 1;

Fig. 3 is a semischematic side elevation of the apparatus of the invention showing the second stage in the continuous batt forming process;

Fig. 4 is a semischematic top plan view of the device of Fig. 3;

Fig. 5 is a semischematic side elevation of the third stage of the process in the manufacture of the insulation batt;

Fig. 6 is a top plan view of the device of Fig. 5;

Fig. 7 is a sectional fragmentary view taken along lines 7—7 of Fig. 1;

Fig. 8 is a semischematic top plan view of the fourth stage of the batt forming process; and, Fig. 9 is a schematic oblique view illustrating the compaction achieved in the manufacturing process.

As described herein the apparatus of this present invention will be described as utilizing the fibers from redwood bark, however such is merely illustrative of one embodiment. With minor modifications to the infeed apparatus this invention will work equally well with any fibrous material that is used for insulation purposes.

In detail with reference to Figs. 1, 2 the numeral 1 denotes an infeed conveyor which is adapted to convey dry, fluffed redwood bark fibers 2 to be deposited in a collection hopper 3.

The fibers 2 as carried on conveyor 1 are in a dry, fluffed, bulk state as they would be when the bark of the redwood tree has been properly prepared by being broken up into a fibrous form. The machinery for doing this is of a conventional nature and therefore is not shown in the drawings.

Located within hopper 3 is an inclined endless belt conveyor 4 with a plurality of outwardly projecting spikes 5 extending perpendicularly from said belt. Each spike 5 is adapted to pick up a small portion of the bulk fibers 2 that are delivered to hopper 3 and thus convey said fiber upwardly out of hopper 3 to be gravity fed to the intake port 6 of a conventional centrifugal blower unit 7. Connected with inlet port 6 is a vertically extending chute 8 down which the fibers fall into intake port 6 of blower 7. Blowers 7 may be powered by conventional driving means such as electric motors 9 (Figs. 1, 2).

As seen in Fig. 2 the spiked conveyor 4 is adapted to extend across the entire width of hopper 3. The spikes 5 are placed at predetermined intervals longitudinally of belt 4 and in parallel rows in order to provide means, entirely across the width of said belt, for gripping the bulk fibers 2 at the bottom of hopper 3. One or more blowers 7 may be required depending upon the width of the hopper 3. An alternative method is to elevate the fibers by means of a spiked conveyor and to deliver them by gravity into a rotating spinner head at the intake end of the settling chamber to be described.

Extending upwardly from each blower 7 is an outlet conduit or duct 10 that is connected to the small end of a diverging transition piece 11 which terminates in a wide vertically placed opening 12. The transition piece 11 decreases the velocity of the air and the fibers carried thereby and spreads the blast out uniformly over the width of an air settling chamber, generally designated 13, now to be described.

The fibers of the redwood bark or the like that have been introduced into the blower 7 are thoroughly whirled about and mixed with the air and held in suspension thereby and dispelled from the openings 12 of the transition pieces 11. The air settling chamber 13 is an elongated chamber of varying ceiling height that is provided to enclose the fibers 14 that have been injected therein while said fibers settle to the lower, flat surface 15 of said chamber. The air chamber 13 comprises an end wall 16, a pair of side walls 17, 18 and an end wall 19 at the far end of said chamber.

Air escape vents 20 are provided atop the lower end of chamber 13 to permit the air that is introduced into chamber 13 to escape thus preventing the building up of air pressure within chamber 13. The pressure within the chamber is thus kept at substantially the same level as the pressure outside the chamber by the exhaust vents 20.

The cubical volume of the chamber 13 is sufficient to permit said chamber to act as a dead air space. Because the velocity of the air within the chamber is greatly reduced the air no longer acts as a vehicle by which the fiber particles 14 may be carried. The fiber particles 14, upon entering chamber 13, drop or rain down upon the lower flat surface 15. Of course the larger, heavier particles drop first and therefore settle to the bottom closer to wall 16 than do the lighter particles which will drift down with the air to the far end of the chamber. In order to facilitate the settling of the lighter particles and to prevent their being carried out vents 20 the upper or ceiling wall 21 of the chamber 13 converges toward surface 15 (Fig. 1). Because the ceiling 21 gets progressively closer to the bottom surface 15 it also forces any fibers 14, that are carried in the air, to get closer to said bottom surface, but not so close as to cause any disturbance of the previously settled fibers. Because of the large discharge area and the increased elevation of vents 20, the force of gravity is enough to overcome the buoyant forces of the escaping air thus preventing the fine or lighter fiber particles from escaping out said vents. The settling chamber 13 need not necessarily be provided with a continuous ceiling such as indicated in the drawings, but the desired effect may be obtained by providing a plurality of vertically disposed baffles spaced apart longitudinally of the direction of travel of the conveyor and formed with their lower edges progressively closer to the surface 15 in said direction.

As seen in the above structure, when fiber particles 14 are introduced into the settling chamber 13 the sudden slowing of the air currents causes the suspended fibers to begin to settle downwardly. The heaviest particles begin to settle out first while the lighter ones are carried slowly along through the chamber until they too settle. The progressively declining upper wall or ceiling 21 or baffles further facilitates the settling of the light particles.

As stated above it is an object of the invention to form a uniform felted mass by a continuous process and further to provide for the intermeshing of the fibers by favorably orienting them with respect to one another. Means for accomplishing this will now be described.

Surface 15 is not stationary or rigid with chamber 13 but rather is the conveyor pan of a vibrating conveyor 24. Conveyor 24 forms the bottom surface of the settling chamber 13 and also extends therefrom through an opening in end wall 19. The conveying surface 15 of the vibrating conveyor 24 is supported on a plurality of coil springs 25 which, when set to oscillating at their resonant frequency supply both the motive force and vibratory power to the conveyor. Conveyor 24 is supported on a platform 26 that is parallel to and beneath conveyor surface 15. The said conveying surface 15 is connected to said platform 26 by a plurality of fixed, parallel arm spring links 27. A motor 28 is connected to an eccentric shaft 29 which in turn is connected to the front end of the conveyor surface 15 by means of a connecting rod 30. The vibrating conveyor described herein is a commercially available item and no claim is made to the same except in combination with the remaining apparatus.

As seen in Fig. 7 the side portions of the conveyor pan 15 are offset at 32 to extend upwardly alongside the outer surfaces of side walls 17, 18 of chamber 13. The offsetting of the pan side portions prevents the leakage of fibers from within chamber 13.

The speed of forward travel of the layer of fibers that has settled on surface 15 is dependent upon the frequency and the magnitude of the vibration that is imparted to surface 15. By correctly selecting the forward travel speed for the layer of fibers, hereafter generally designated 35, the thickness of the layer may be regulated by the rate of infeed of the bulk fibers 2. By keeping the layer 35 in continuous forward motion it is evident that a uniform thickness and density is obtained for any fixed rate of infeed of fibers.

The main purpose of the vibrating surface 15 is to settle the fibers. The mere forward motion of such fibers could be just as easily accomplished by such conventional means as a slowly moving endless conveyor belt. It has been found that a layer of fibers such as layer 35 that has been deposited on a surface, such as surface 15, can be settled and compacted as much as fifty percent merely by vibrating said surface in a generally vertical manner. It is true that a similar effect of compaction could be achieved by passing the layer 35 through a series of rollers. However, pressure rollers will not accomplish the desired fiber orienting effect as will be explained.

If the vibrations of conveyor 24 were in a vertical direction only there would result the desired settling and compaction but no forward motion would result. By directing the vibrations along an upwardly directed vector having a component along the path of travel the same advantageous compaction of the fibers results along with a continuous forward motion of the entire layer 35. A common disadvantage of rollers for compacting such a substance as the fiber of redwood bark and other insulation fibers is that said rollers merely squeeze the fibers together irrespective of their orientation. Upon passing through the rollers the natural resiliency of the fibers causes them to spring partially back to their original condition. By using pressure rollers the natural locking of the fibers together is not accomplished; the use of vibration allows the fibers to compact to their optimum natural intermeshing that will result in an insulation of the desired qualities. If the fibers are not compacted sufficiently, the voids and interstitial spaces remaining between said fibers will allow convective air currents. If the fibers are compacted too much, the fibers will act as a heat transfer medium by conduction. Optimum insulating qualities result when the fibers have been compacted to their natural, or unforced limit. Such optimum compaction is achieved by the vibrating settling pans and conveyors of this invention.

While all fibers organic or otherwise have their individual characteristics, they have one property in common, that is, a specific length that usually is many times their diameter or thickness. Some fibers are quite straight while others are crinkled, bent, curved, flat, or even like animal hair possessing barbs at spaced intervals along their length. Therefore when fibers such as these are introduced into a large volume of quiet air, as in the case of the present invention, they will assume every possible angle of repose. It is equally evident that when acted upon by gravity they will come to rest, after falling, at the bottom of the chamber in a random generally horizontal position. No attempt is made to control the directional flow of the fibers while they are settling.

If the floor of the chamber were stationary and not vibrating it is obvious that a very light density of fibers would be quickly built up. This mass of fibers would be without any strength because the fibers would not be intertwined and meshing with one another but merely lying loosely atop each other. By vibrating the floor of the chamber in a generally vertical manner an immediate settling of the fibers begins to take place. This settling is initially rapid with a gradually diminishing rate of settling following until no further apparent settling takes place. In the present invention this settling can be accomplished in the time interval of about one minute. Therefore hours, or even days of further vibration would serve no practical purpose. In the case of wood fibers such as redwood bark the settled mass will show a decrease in perpendicular thickness of forty-five to fifty-five percent. This means that two cubic feet of loosely settled fibers, after being subjected to the above described vibration, will occupy only one cubic foot of space resulting in an increase of density of one hundred percent. The natural ability of the fibers to bind themselves together has been greatly increased resulting in a homogeneous mass of interlocked fiber particles.

It will be noted at this point that while layer 35 is allowed to shrink in thickness it still fills the width of the vibrating conveyor pan 15.

While undergoing vibration the fibers have a tendency to assume a more horizontal position, simultaneously while endeavoring to push their ends into a more horizontal plane the fibers compact and interlock with each other.

It will be seen that the insulation batt that is formed in the chamber 13 is of a uniform density, but the fibers which are closest to the bottom surface 15 are larger and the fibers get progressively finer in size toward the top of the layer 35. This in no way impairs the insulating qualities of the batt, but, if it is desired that the cross-sectional appearance of the batt be uniform this may be easily accomplished by making both ends of chamber 13 inlets. Thus in this modified chamber the lowermost portion of ceiling 21 and the air escape vents 20 would be in the middle of the chamber and the fibers would be simultaneously introduced to chamber 13 from both ends.

The vibrating conveyor 24 extends beyond the chamber 13 in order to carry the continuous layer 35 of fibers therefrom. At the termination of conveyor 24 the layer 35 of settled fibers continues onto a smooth elongated warped surface or transition piece 39 that is provided to turn the layer 35 through an angle of ninety degrees so that it is then supported on one edge.

The transition piece 39 may be connected to conveyor 24, or can be vibrated in unison therewith by a separate vibration unit. As shown in the drawings piece 39 is vibrated by conveyor 24 and is supported atop a frame 40. The transition surface 39 is in contiguous alignment with conveyor 24 and a subsequent vibrating conveyor 42.

The vibrating conveyor 42 is of generally the same structure as conveyor 24 except that it is relatively narrow (Fig. 4) and is provided with a pair of spaced, parallel, vertical walls 43, 44 for the purpose of confining and guiding the layer 35 of fibers that has been turned on edge.

The vibrations of the second conveyor 42 are synchronized with conveyor 24 so that they act as one continuous conveyor.

As seen in Fig. 4 wall 43 is effectively a continuation of the warped surface 39. Wall 44 opposed to wall 43 is adapted to guide what previously was the top surface of layer 35. Wall 44 is adjustable in its spacing from wall 43 to suit the various thicknesses of felted ribbon that may be made. To this end wall 44 may be supported on braces 45, each formed with a plurality of apertures 46 for adjusting the width of the spacing between walls 43, 44.

The dot-dash line 47 in Fig. 3 shows the edgewise settlement that takes place in the fiber layer 35 while on conveyor 42. The amount of settlement that takes place on conveyor 42 as indicated by dot-dash line 47 may be predetermined thus allowing the correct width of layer 35 to be established in chamber 13 to produce the correct length of batt as a final product.

Again on conveyor 42, as on conveyor 24 the vibrations tend to orient the individual fibers into a horizontal plane. It is obvious that when the layer 35 is turned on edge the fibers are then essentially all in parallel planes, but point in all directions. Subsequent vibrating on conveyor 42 will tend to again orient the fibers so they will be further intermeshed and compacted. It will be noticed from the drawings that the same percentage of compaction does not take place along conveyor 42 as is accomplished on conveyor 24. This is because the fibers have already been initially compacted and are not as loose as they are in chamber 13.

After the desired amount of settling has taken place on conveyor 42 the continuous layer 35 advances to a cut-off station at the far end of conveyor 42 where a conventional, track mounted saw 48 automatically cuts off sections of the continuous fiber layer to the correct width.

Saw 48 is mounted on a pair of rails 49 that are mounted on a slight incline to allow the saw 48 to make a transverse cut across layer 35 while the latter is in continuous forward motion. One of the saw guide rails 49 may also be a gear rack or the like which may be in mesh with a gear pinion driven by an auxiliary motor (not shown) thus providing the motive power for the saw carriage. By using a system of delayed action switches or any other convenient conventional device the saw 48 can be controlled automatically and be adapted to cut off a batt on each upward stroke of its travel. The saw blade extends into the space between walls 43, 44 through a slot 50 in wall 44. The slot 50 is parallel to the path of travel of the saw carriage that is indicated by the double headed arrow 51. The cut-off means is of a conventional nature and no claim is made of such except as a component of the overall invention disclosed herein. It will be understood that the cut-off step may be performed if desired while the felt is horizontally disposed and before it is turned to the vertical position of Fig. 3.

After being cut off from the continuous layer 35 the batts, hereinafter denoted by 35a are toppled from the end of conveyor 42 by means of an arcuate deflector piece 55 onto another similar vibrating conveyor 52. Conveyor 52 is in line with conveyor 42 but at a lower elevation in order to allow the batts 35a to rest on their edges made by the saw 48. As seen best in Fig. 6 conveyor 52 is provided with a pair of spaced, parallel walls 53, 54 which guide and confine the cut batts 35a therebetween. In Fig. 5 the batts 35a are shown in dotted line and as the batts proceed along the conveyor 52 they are compacted once again, this time in width. Again the fibers in the batts tend to assume a horizontal orientation thus more closely knitting the individual fibers together.

Upon reaching the end of conveyor 52 the batts 35a are engaged by a deflector plate 56 (Fig. 8) which causes the batts to be turned through ninety degrees and be deposited on a wire or open mesh endless type of conveyor 57. The batts 35a lie flat on the conveyor 57 and while being carried by said conveyor are transported through a spray booth 58 (Fig. 8) where a plurality of nozzles 59 direct a spray of a non-hardening solution such as latex or "Saran" over the outer surface of the batts. The coating solution is supplied to nozzles 59 by means of a supply pipe 65 connected to an appropriate source of pressure indicated by arrow 66.

By using a non-hardening solution such as latex the batts always remain pliable and deformable, yet the surface fibers of the batt do not work loose and rub off the batt. It is not necessary to coat the batts with a paper or the like, but if such is desired the paper may be applied as the batts emerge from the spray booth. If desired, additional spraying may be carried out during the vibrating steps. The batts dry in the atmosphere or may be artificially dried as they proceed along the part of conveyor 57 that emerges from the spray booth 58. The insulation batts are now finished and are ready for installation in a building.

Fig. 9 schematically illustrates the steps in the compaction of an original volume of fibers. The original volume shown in dotted lines is numbered 60. The first stage of compaction which takes place in the air chamber 13 is represented by the bracketed distance 61 between the top of the dotted rectangular solid 60 and the full line solid 62. The second stage of compaction, which takes place on conveyor 42 is represented by the bracketed distance 63. The third and last stage of compaction takes place on conveyor 52 after the batt 35a has been cut from the continuous layer 35 and is represented by the bracketed distance 64.

The insulation batts 35a that are made by the method and device of this invention are of a firm, uniform density. They remain pliable and deformable in storage and in use, are less costly to manufacture and, due to the latex coating they will not fall apart with repeated handling.

This invention as disclosed herein is merely representative of a preferred form. Many minor modifications and changes can be resorted to that will not depart from the spirit of this invention or the scope of the following claims.

I claim:

1. The method of making a felt or batt from fibrous material comprising the steps of arranging a loosely packed layer of fibers on a horizontal supporting surface and simultaneously vibrating said surface, turning said layer through ninety degrees about a horizontal axis onto one edge of said layer and vibrating said layer, and thereafter turning said layer through ninety degrees onto one end thereof and vibrating the same.

2. The method of making a felt or batt from fibrous material comprising the steps of: suspending fibers of said material in air and permitting them to fall downwardly by gravity, supporting a layer of the falling fibers on a horizontal supporting surface while continuously vibrating said surface, turning said layer through ninety degrees about a horizontal axis onto an edge of said layer and vibrating said layer, and thereafter turning said layer through ninety degrees about a horizontal axis perpendicular to said first mentioned axis and vibrating said layer.

3. The method of making a felt or batt from fibrous material comprising the steps of: suspending fibers of such material in air and permitting them to fall downwardly by gravity, supporting a layer of said falling fibers on a first horizontally elongated supporting surface and simultaneously subjecting said surface to vibrations having vertical and horizontal components whereby said layer is moved in one direction horizontally longitudinally of said supporting surface, turning said layer through ninety degrees about an axis extending horizontally in said direction and supporting said layer on one of its longitudinally extending edges on a second horizontally extending supporting surface during said movement and simultaneously vibrating said second surface, and thereafter turning said layer about a horizontal axis at right angles to said first mentioned axis onto a third supporting surface and vibrating said third surface.

4. A continuous method of making a felt or batt from fibrous material comprising the steps of: discharging fibers of such material suspended in air into a settling chamber and permitting said fibers to fall downwardly by gravity, supporting said fibers in a layer on a first horizontally elongated supporting surface and simultaneously subjecting said surface to vibrations having vertical and horizontal components whereby said layer is moved in one direction horizontally longitudinally of said supporting surface, turning said layer gradually through ninety degrees about a first axis extending horizontally in said direction and supporting said layer on one of its longitudinally extending edges on a second horizontally extending supporting surface during said movement and simultaneously vibrating said second surface, turning said layer through ninety degrees about a second horizontal axis at right angles to said first axis and supporting said layer on one of its ends on a third surface and vibrating said third surface, and thereafter spraying said layer with a coating of resilient material to form a pliable jacket.

5. A continuous method of making a felt or batt from fibrous material comprising the steps of: discharging fibers of such material suspended in air into a settling chamber and permitting said fibers to fall downwardly by gravity, supporting said fibers in a layer on a first horizontally elongated supporting surface and simultaneously subjecting said surface to vibrations having vertical and horizontal components whereby said layer is moved in one direction horizontally longitudinally of said supporting surface, turning said layer gradually through ninety degrees about a first axis extending horizontally in said direction and supporting said layer on one of its longitudinally extending edges on a second horizontally extending supporting surface during said movement and simultaneously vibrating said second surface, cutting said layer transversely at spaced points along its length to form batts, successively turning said batts through ninety degrees about a second horizontal axis at right angles to said first axis and supporting said batts on one of their ends on a third surface and vibrating said third surface, and thereafter spraying a coating of adhesive material over said batts.

6. The method of making a felt or batt from fibrous material comprising the steps of: arranging a loosely packed layer of fibers on a horizontal supporting surface and simultaneously vibrating said surface, turning said layer through ninety degrees about a horizontal axis onto one edge of said layer and vibrating said layer, cutting said layer transversely into batts turning said batts through ninety degrees about an axis at right angles to said first mentioned axis onto one end of said batts and vibrating the same vertically, and thereafter spraying said batts with a coating of adhesive material.

7. Apparatus for forming felts and batts from fibrous material comprising: a settling chamber, means for discharging fibers of said material suspended in air into said chamber, a horizontally elongated supporting surface in said chamber adapted to receive a layer of said fibers thereon as the latter fall downwardly in said chamber by gravity, means for vibrating said surface for continuously moving said layer in one direction out of said chamber and simultaneously compacting the fibers of said layer as it is formed, turning means in extension of said surface for turning said layer about a horizontal axis extending in said direction onto one of the longitudinally extending edges of said layer, a horizontally elongated support for supporting said layer on said one edge, means for vibrating said support for continuing said movement in said direction and for further compacting said fibers, cutting means for cutting said layer transversely of its length during said movement to form separate batts, turning means for turning said batts through ninety degrees about a horizontal axis at right angles to said first mentioned axis onto one of their ends, and means for supporting and vibrating said batts after they are so turned.

8. Apparatus for forming felts and batts from fibrous material comprising: a settling chamber, means for discharging fibers of said material suspended in air into said chamber, a horizontally elongated supporting surface in said chamber adapted to receive a layer of said fibers thereon as the latter fall downwardly in said chamber by gravity, means for vibrating said surface for continuously moving said layer in one direction out of said chamber and simultaneously compacting the fibers of said layer as it is formed, turning means in extension of said surface for turning said layer about a horizontal axis extending in said direction onto one of the longitudinally extending edges of said layer, a horizontally elongated support for supporting said layer on said one edge, means for vibrating said support for continuing said movement in said direction and for further compacting said fibers, cutting means for cutting said layer transversely of its length during said movement to form separate batts, turning means for turning said batts through ninety degrees about a horizontal axis at right angles to said first mentioned axis onto one of their ends, and means for supporting and vibrating said batts after they are so turned and means for spraying said batts with a coating of rubberlike material.

9. The method of making a felt from fibrous material comprising the steps of: suspending fibers of such material in air and permitting them to fall downwardly by gravity, supporting a layer of said falling fibers on a horizontally extending surface and simultaneously subjecting said surface to vibrations having a vertical component whereby said fibers are arranged in relatively closely intermeshing relationship in generally horizontal planes, turning said layer about a longitudinally extending axis to a vertical position and subjecting the same to vibrations having a vertical component to settle the fibers of said layer in a vertical direction.

10. The method of making a felt from fibrous material comprising the steps of: suspending fibers of such material in air and permitting them to fall downwardly by gravity, supporting a layer of said falling fibers on a horizontally extending surface and simultaneously subjecting said surface to vibrations having a vertical component whereby said fibers are arranged in relatively closely intermeshing relationship in generally horizontal planes, turning said layer about a longitudinally extending axis to a vertical position, exerting equal and opposite restraining forces to opposite sides of said layer while in said vertical position and simultaneously subjecting the layer to vibrations having a vertical component to settle the fibers of said layer in a vertical direction.

11. The method of making a felt from fibrous material comprising the steps of: suspending fibers of such material in air and permitting them to fall downwardly by gravity, supporting a layer of said falling fibers on a horizontally extending surface and simultaneously subjecting said surface to vibrations having an upward vertical component and a horizontal component, said horizontal component being operative to advance said layer in one direction relative to said surface while said vertical component is settling said fibers in relatively closely intermeshing relationship.

References Cited in the file of this patent

UNITED STATES PATENTS

| | | |
|---|---|---|
| 1,234,495 | Sargent | July 24, 1917 |
| 1,636,977 | Anderson | July 26, 1927 |
| 1,765,026 | Miller | June 17, 1930 |
| 1,858,328 | Heymann et al. | May 17, 1932 |
| 2,116,663 | Powell | May 10, 1938 |
| 2,655,895 | Abeles | Oct. 20, 1953 |